United States Patent
Zaehring (10) Patent No.: US 10,425,461 B1
(45) Date of Patent: Sep. 24, 2019

(54) DISPLAY STEGANOGRAPHY FOR ACTIVE CORRELATION OF DATA

(71) Applicant: Rockwell Collins, Inc., Cedar Rapids, IA (US)

(72) Inventor: James M. Zaehring, Edmonds, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 282 days.

(21) Appl. No.: 15/614,966

(22) Filed: Jun. 6, 2017

(51) Int. Cl.
*H04L 29/06* (2006.01)
*H04N 21/2347* (2011.01)
*H04N 21/2343* (2011.01)

(52) U.S. Cl.
CPC ..... *H04L 65/607* (2013.01); *H04N 21/23476* (2013.01); *H04N 21/234345* (2013.01)

(58) Field of Classification Search
CPC .......... H04L 65/607; H04N 21/234345; H04N 21/23476
See application file for complete search history.

(56) References Cited

U.S. PATENT DOCUMENTS

| | | | |
|---|---|---|---|
| 8,045,749 B2 * | 10/2011 | Rhoads | G01C 11/00 382/100 |
| 10,158,840 B2 * | 12/2018 | Mishra | G06T 1/0028 |
| 10,212,306 B1 * | 2/2019 | Goyal | H04N 1/32352 |
| 2002/0010684 A1 * | 1/2002 | Moskowitz | G06F 21/10 705/75 |
| 2006/0190810 A1 * | 8/2006 | Piersol | G06F 17/243 715/236 |
| 2009/0070805 A1 * | 3/2009 | Delia | H04N 7/163 725/34 |
| 2009/0324203 A1 * | 12/2009 | Wiklof | H04N 1/00933 386/291 |
| 2013/0077817 A1 * | 3/2013 | Naparstek | G06F 21/6209 382/100 |
| 2017/0090418 A1 * | 3/2017 | Tsang | G03H 1/0841 |
| 2017/0124818 A1 * | 5/2017 | Ullrich | G06F 3/167 |

* cited by examiner

*Primary Examiner* — Mishawn N. Hunter
(74) *Attorney, Agent, or Firm* — Angel N. Gerdzhikov; Donna P. Suchy; Daniel M. Barbieri (57) ABSTRACT

An avionics computer system steganographically encodes streaming data, and serial buffer output data into a current avionics display corresponding to the system generating the data. The encoded pixels are limited to black spaces within color channels of the display. The data is encoded into reproducible blocks within the display and the blocks are copied within the display for error correction.

17 Claims, 9 Drawing Sheets

DISPLAY STEGANOGRAPHY FOR ACTIVE CORRELATION OF DATA

BACKGROUND

Data-limited display issues and in flight errors are routinely difficult to reproduce, due to limited amounts of data available, difficulty correlating data to the display event, and lack of availability of instrumented buses and recorded data. Troubleshooting such problems is time consuming and expensive, or even impossible.

Consequently, it would be advantageous if an apparatus existed that is suitable for recording and correlating data to corresponding displays in an unobtrusive way.

SUMMARY

In one aspect, embodiments of the inventive concepts disclosed herein are directed to a computer system that steganographically encodes streaming data useful for troubleshooting into an avionics display.

In a further aspect, the encoding is limited to identified black spaces in each color channel of the display.

In a further aspect, encoded pixels comprise one of three states defined by a median value and variants indistinguishable to the human eye.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to computer systems for encoding streaming data into a display such that the streaming data is visually transmissible but imperceptible to a viewer.

Figure 1:
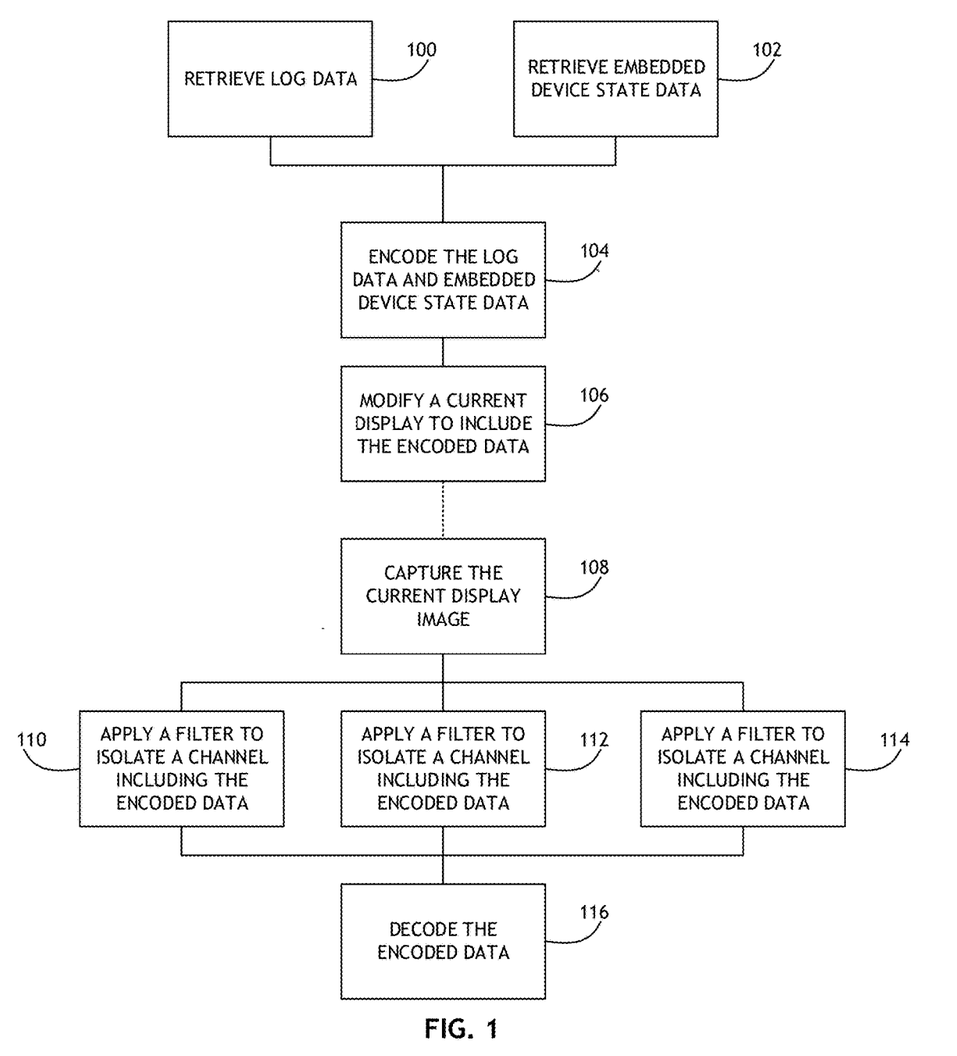
FIG. 1 shows a flowchart of a method for encoding streaming data into an avionics display according to an exemplary embodiment of the inventive concepts disclosed herein.

Referring to FIG. 1, a flowchart of a method for encoding streaming data into an avionics display according to an exemplary embodiment of the inventive concepts disclosed herein is shown. Streaming data (such as error data, log data, system state data, or any other data useful for performing diagnostic tests) is retrieved 100 from a data storage device and encoded 104 according to the methodologies set forth herein. Such encoding 104 may comprise generating a graphical component having pixel values corresponding to the streaming data. In one exemplary embodiment, where each pixel comprises three eight bit values, the least significant bits of each eight bit value may be converted for encoding the streaming data. In that case, the streaming data is encoded as minor variations in pixel color components in the graphical component.

In some embodiments, the streaming data also includes serial output buffer data 11 to identify the current read/write state of the system at the time of any error.

A current display image on a display device is then modified 106 to include the encoded graphical component. In some embodiments, the modification 106 may be implemented by a graphical processing unit altering a rendered graphic produced by some other system application. Alternatively, the modification 106 may be implemented by a parallel application or component within each system application to include the encoded graphical component at the time the application produces the graphic. Furthermore, in certain legacy systems where altering existing code is unfeasible, the modification 106 may be implemented via a graphical filter application that removes certain data from pixels in a graphic and replaces it with encoded graphical component data.

The modified current display image is captured 108, and filters are applied 110, 112, 114 to isolate components of each color channel including the encoded streaming data. In at least one embodiment, capturing 108 the current display image is accomplished via a passive fiber tap. Alternatively, the current display image may be captured 108 via a mobile device. The filtered image is then decoded 116 to retrieve the streaming data.

A system according to embodiments of the inventive concepts herein does not need to allow a troubleshooting or error reporting system data access to error logs or other internal system state information, which may be insecure or otherwise violate certification standards. Instead, streaming data is relayed optically, but in an unobtrusive manner. In at least one embodiment, the streaming data may also be encrypted before it is encoded onto the display image.

Figure 2:
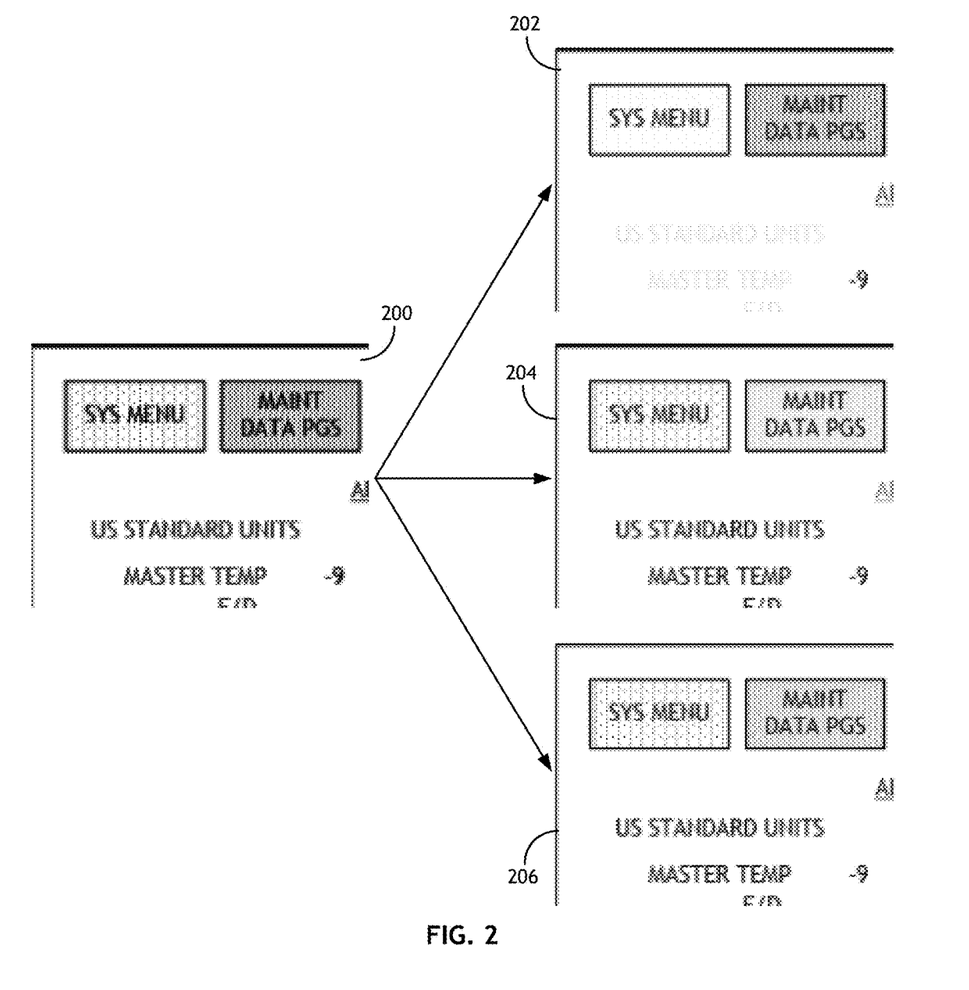
FIG. 2 shows an exemplary portion of an avionics display useful for implementing embodiments of the inventive concepts disclosed herein.

Referring to FIG. 2, an exemplary portion of an avionics display 200 useful for implementing embodiments of the inventive concepts disclosed herein are shown. An avionics display including the exemplary portion 200 may comprise relatively simple graphical components such as text differentiated by color. The exemplary portion 200 may be separated into a blue channel 202, a green channel 204, and a red channel 206. Each channel 202, 204, 206 may define an eight or sixteen bit value for each pixel 2.

Figure 3:
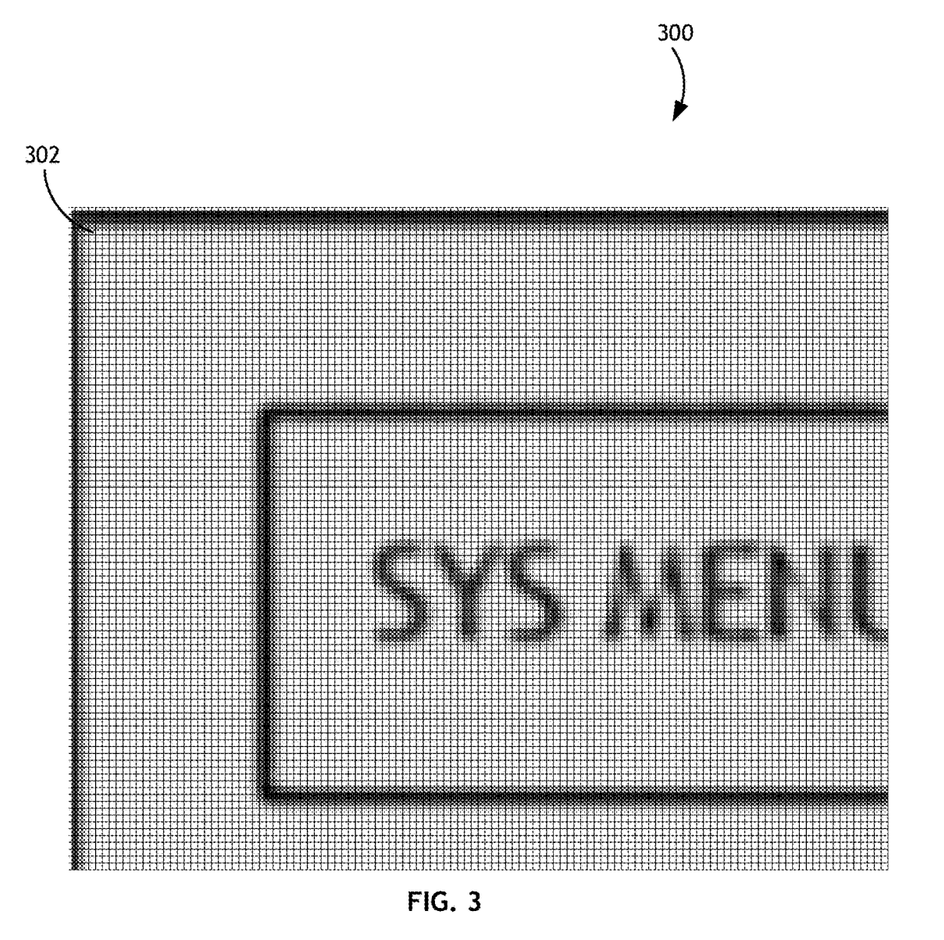
FIG. 3 shows a diagram of a portion of an avionics display with delineated pixels according to an exemplary embodiment of the inventive concepts disclosed herein.

Referring to FIG. 3, an exemplary portion 300 of an avionics display useful for implementing embodiments of the inventive concepts disclosed herein is shown. The portion 300 may comprise a single channel of a color display. The channel defines values for each pixel 302 in the display, including two or more least significant bits that define minor variations to the pixel 302 color within the channel.

Figure 4:
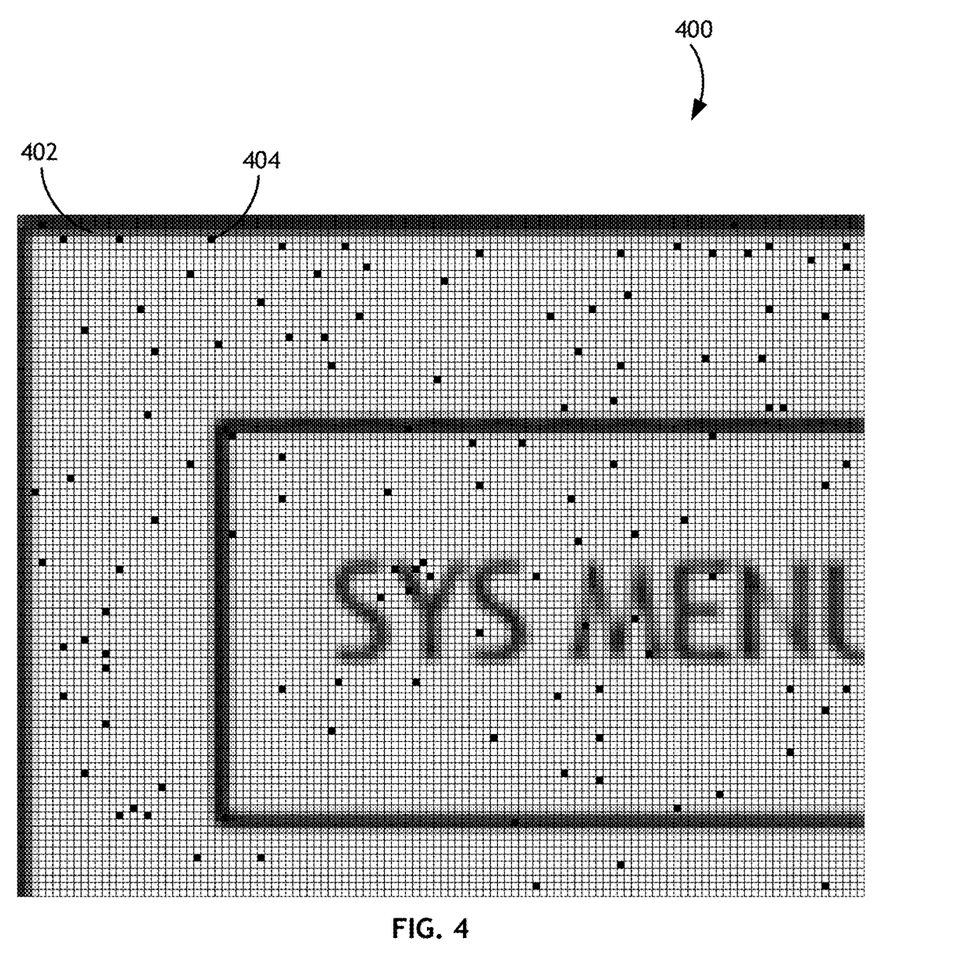
FIG. 4 shows a diagram of a pixel map encoding streaming data overlaid on a portion of an avionics display according to an exemplary embodiment of the inventive concepts disclosed herein.

Referring to FIG. 4, a diagram 400 of a portion of the avionics display in FIG. 3 with delineated pixels 402 overlaid on a portion of an avionics display according to an exemplary embodiment of the inventive concepts disclosed herein is shown. The diagram 400 represents a pixel map for encoding data by converting the data to color values of encoded pixels 404.

In at least one embodiment, data is encoded such that the each color channel of each encoded pixel 404 comprises one or more bits of information. That is, each color channel of the encoded pixel 404 comprises either a zero value or a non-value defined by the least significant bits of each color channel of the encoded pixel 404, and all of the encoded pixels 404 define the encoded streaming data.

Alternatively, in at least one embodiment, data is encoded such that each color channel of each encoded pixels 404 may comprise more than a single bit; for example, where each color channel includes two least significant bits, three possible values per color channel are defined. Such range may be defined by the capacity of the receiving system to distinguish one value from the next. For example, where the receiving system has sufficient resolution to distinguish 255 shades within a single color channel, each encoded pixel 404 may contain eight bits of data. However, where the resolution of the receiving system is less certain, the range of available values for each encoded pixel 404 may be restricted.

In some embodiments, the pixel map is updated in real-time or near real-time as streaming data is updated. Updating the pixel map may comprise re-encoding the pixel map or appending new data to the pixel map.

In some embodiments, data may be encoded into a small block of pixels rather than a single encoded pixel 404. For example, data may be encoded into a four pixel block, each pixel encoding identical values. Multi-pixel blocks enhance the ability of the receiving system to correctly identify the encoded pixels 404, and also provided a level of error correction.

In some embodiments, the streaming data being encoded may be compressed via LZ4, LZW, Huffman coding, or some other suitable compression algorithm. Furthermore, the data to be encoded may be reduced to a limited ASCII set.

In some embodiments, a computer system may produce a pixel map for each color channel defining updated least significant bit values for the associated channel corresponding to the encoded values for that channel. The pixel maps for each color channel may be applied to update each color channel; the separate color channels then being combined to form an encoded graphic.

In at least one embodiment, the pixel map available for encoding is limited to portions of the avionics display that would otherwise be black, and otherwise contain substantially no information. For clarity, the drawings depict a white background, but in actuality, avionics backgrounds are generally black.

In one exemplary embodiment of an encoding methodology, the encoding system identifies if the color channel value for each pixel is less than some predetermined threshold. If so, the encoding system overrides the least significant bit of the existing color channel value and replaces it with a value corresponding to the encoded bit.

In one exemplary embodiment, each color channel of each pixel may encode a single bit based on a relative difference as compared to an original least significant bit color channel value. For example, if the original color channel value is 0 (or some value equitable to 0 in an encoding algorithm) the encoded value for 1 is the original color channel value plus 1 while the value for 0 is the original color channel value. If the original color channel value is 1 (or some value equitable to 1 in an encoding algorithm) the encoded value for 1 is the original color channel value while the value for 0 is the original color channel value minus 1. If the original color channel value is 2 (or some value equitable to 2 in an encoding algorithm) the encoded value for 1 is the color original channel value plus 1 while the value for 0 is the original color channel value. If the original color channel value is 3 (or some value equitable to 3 in an encoding algorithm) the encoded value for 1 is the original color channel value while the value for 0 is the original color channel value minus 1.

In some embodiments, encoding may comprise defining a range difference that is imperceptible to the human eye, then defining a starting value for each encoded pixel, then varying the value by the imperceptible difference, either plus or minus, to encode a value. For example, if the imperceptible range is less than 25, then a value of 15 may define 0, and the encoded value is varied +/−10 to aid with capture recognition flexibility.

Figure 5:
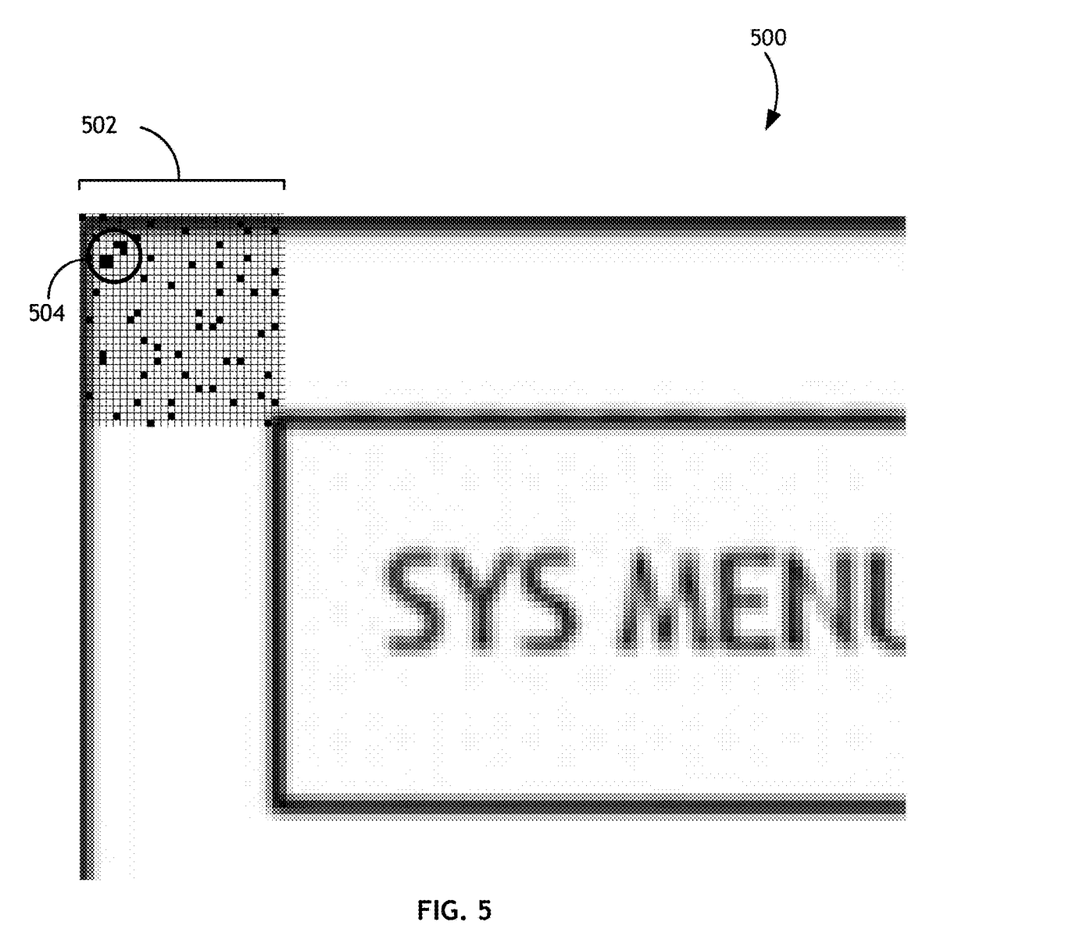
FIG. 5 shows a diagram of a pixel map encoding streaming data overlaid on a portion of an avionics display according to an exemplary embodiment of the inventive concepts disclosed herein.
Figure 6:
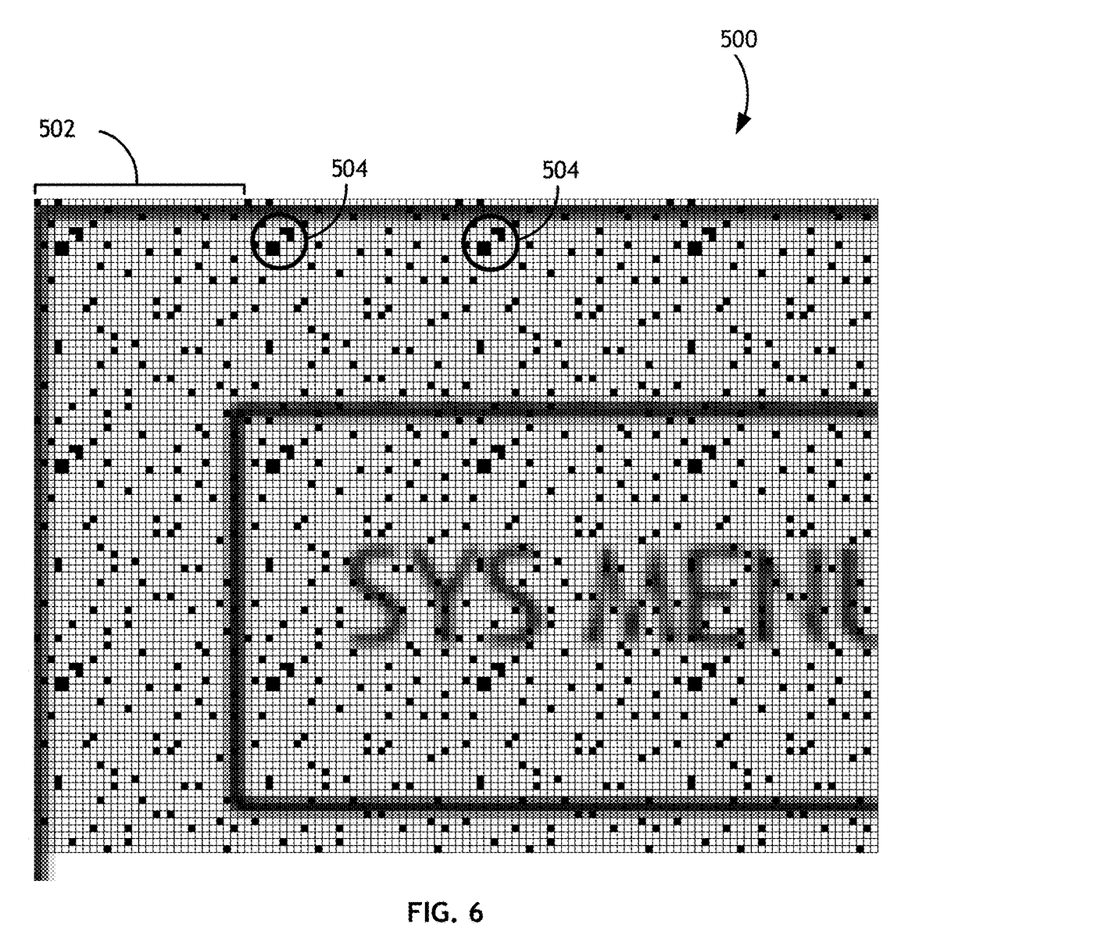
FIG. 6 shows a diagram of a repeated pixel map encoding streaming data overlaid on a portion of an avionics display according to an exemplary embodiment of the inventive concepts disclosed herein.

Referring to FIGS. 5 and 6, diagrams of a pixel map encoding streaming data overlaid on a portion 500 of an avionics display according to an exemplary embodiment of the inventive concepts disclosed herein are shown. In some systems, visual interference may hinder the ability of a receiving system to distinguish encoded pixel values. In that case, a block 502 of encoded data may be periodically replicated over the entire avionics display or some subset of the avionics display.

The block 502 may include an orienting portion 504. The orienting portion 504 identifies a starting portion of the block 502 such that the receiving system may correlate each of a plurality of replicated blocks 502 to identify data lost due to interference. Furthermore, the orienting portion may comprise a known reference color value to allow the receiving system to derive a hue correction value to adjust other encoded pixel color values which may be shifted due to environmental conditions.

Figure 7:
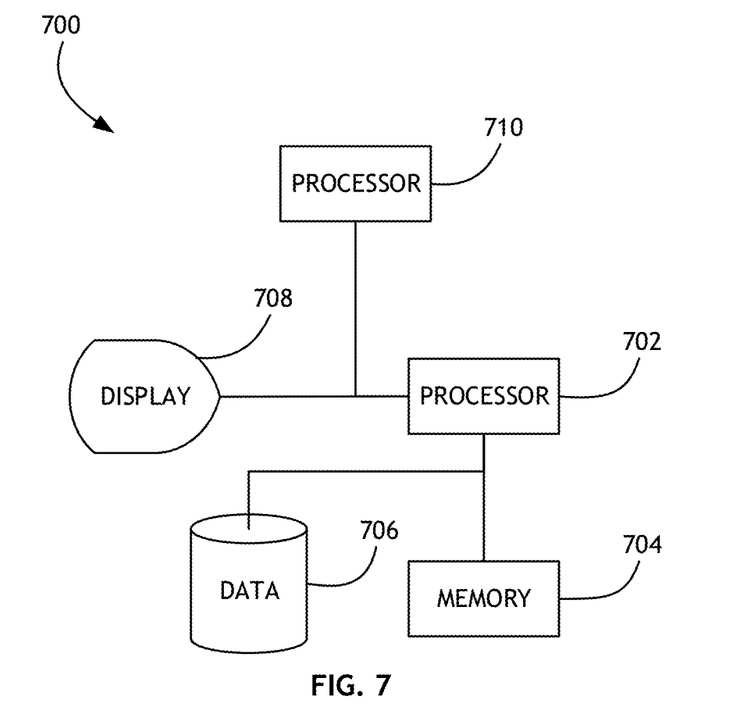
FIG. 7 shows a block diagram an exemplary system for implementing embodiments of the inventive concepts disclosed herein.

Referring to FIG. 7, a block diagram an exemplary system 700 for implementing embodiments of the inventive concepts disclosed herein is shown. The system 700 includes a processor 702, memory 704 connected to the processor 702, a data storage element 706 connected to the processor 702 containing streaming data or system state data to be encoded, and a display 708 for displaying the encoded data.

In at least one embodiment, the system 700 includes an analysis processor 710. The analysis processor 710 is connected to the display 708 via a passive fiber tap or some other mechanism suitable for delivering the current image on the display 708 to the analysis processor 710 for analysis of the encoded streaming data.

Figure 8:
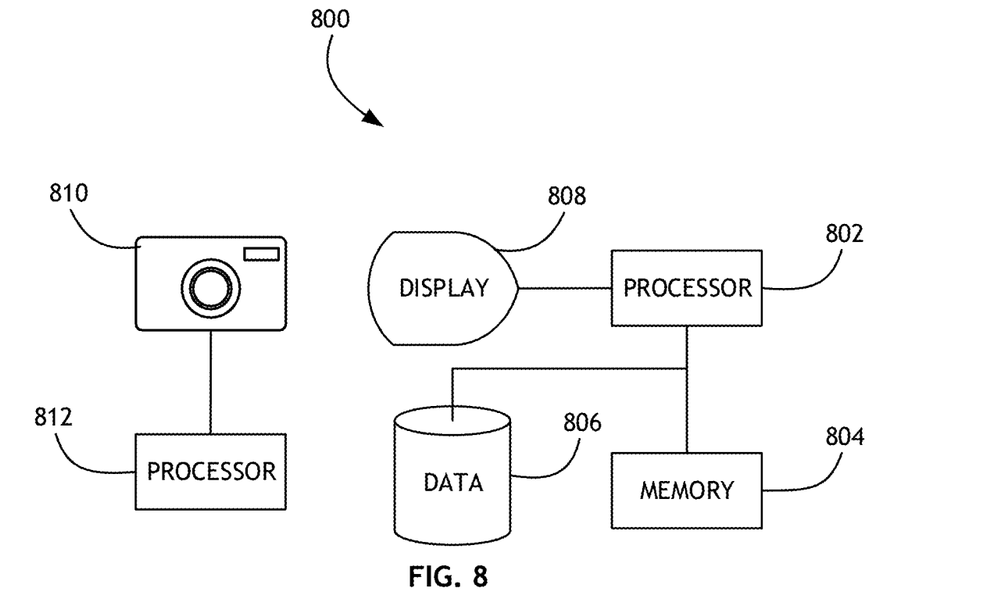
FIG. 8 shows a block diagram of an exemplary system for implementing embodiments of the inventive concepts disclosed herein.

Referring to FIG. 8, a block diagram of an exemplary system 800 for implementing embodiments of the inventive concepts disclosed herein is shown. The system 800 includes a processor 802, memory 804 connected to the processor 802, a data storage element 806 connected to the processor 802 containing streaming data or system state data to be encoded, and a display 808 for displaying the encoded data.

Encoded streaming data from the system 800 is retrieved via a portable imaging device 810. The portable imaging device 810 may comprise a camera, smartphone, tablet, or any other device suitable for capturing the image on the display 808 with sufficient resolution to distinguish bit values as corresponding to colors defined by the encoding algorithm. The imaging device includes or is connected to an analysis processor 812 for analysis of the encoded streaming data.

Figure 9:
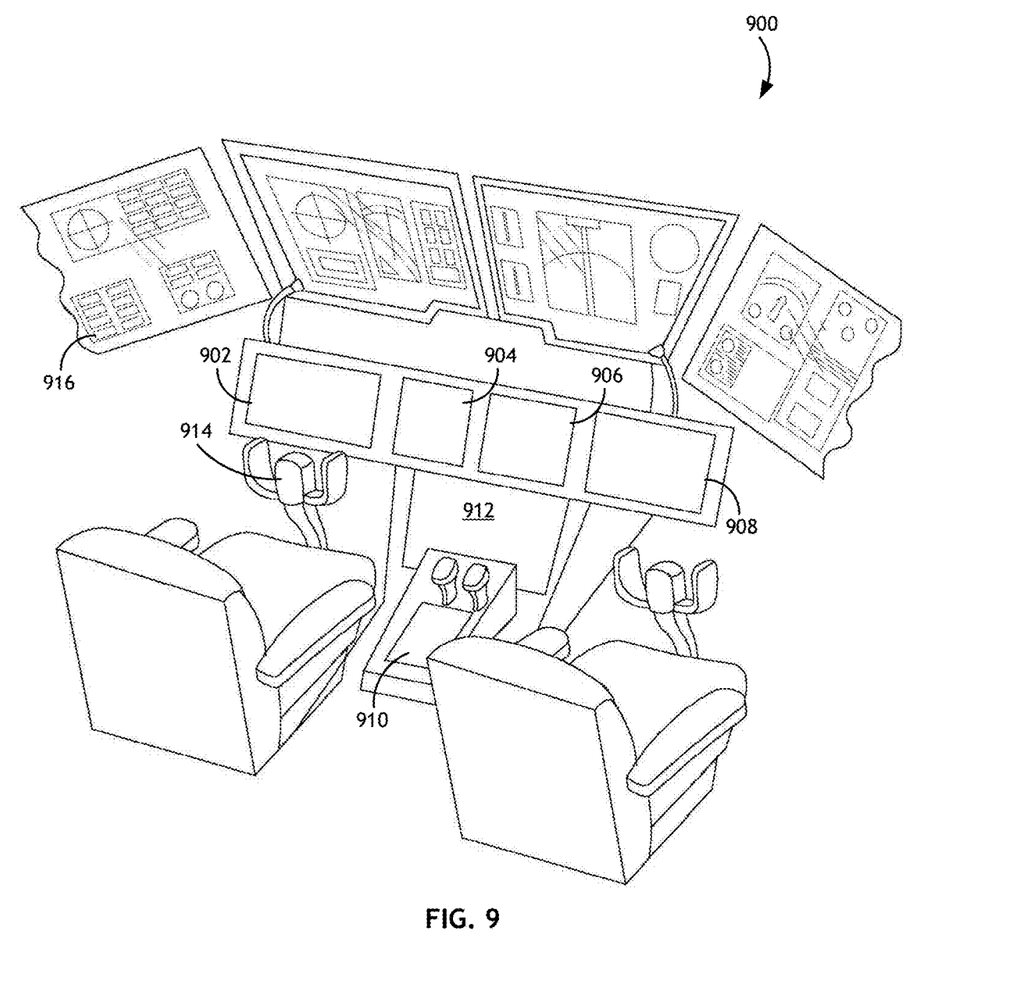
FIG. 9 shows an environmental view of a cockpit including an avionics system according to exemplary embodiments of the inventive concepts disclosed herein.

Referring to FIG. 9, an environmental view of a cockpit 900 including an avionics system according to exemplary embodiments of the inventive concepts disclosed herein is shown. An avionics system in an aircraft includes one or more display devices 902, 904, 906, 908, 910, 912, 914, 916, including non-integrated portable devices in data communication with the avionics system. Each of the one or more display devices 902, 904, 906, 908, 910, 912, 914, 916 may display encoded streaming data according to the methods described herein. Each display device 902, 904, 906, 908, 910, 912, 914, 916 may display encoded streaming data specific to the corresponding device or subsystem, or streaming data for all systems to facilitate the broadest possible distribution.

A person skilled in the art may appreciate that embodiments of the inventive concepts disclosed herein are applicable to systems other than avionics systems. For example, automobile displays may include encoded streaming data. Likewise, general purpose computers or other consumer electronic devices may include encoded streaming data into displays by default or may be placed into an error mode to encode such streaming data.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising: a display device; a data storage device storing streaming data; and at least one processor in data communication with the display device, the data storage device, and a memory storing processor executable code for configuring the at least one processor to: retrieve the streaming data; encode the streaming data; modify a current display image on the display device to include the encoded streaming data in a steganographic form; identify black spaces within the current display image; isolate least significant bits of color channels within the black spaces; and incorporate the encoded streaming data into the isolated least significant bits of each color channel within the blacks spaces.

2. The computer apparatus of claim 1, wherein the processor executable code further configures the at least one processor to:
   isolate least significant bits of one or more color channels within the current display image;
   identify pixels within each color channel having a color value below a threshold; and
   incorporate the encoded streaming data into the isolated least significant bits of the one or more color channels.

3. The computer apparatus of claim 1, wherein the processor executable code further configures the at least one processor to retrieve and encode serial output buffer data.

4. The computer apparatus of claim 1, wherein the processor executable code further configures the at least one processor to:
   generate a reproducible block of modified pixels;
   reproduce the reproducible block at least once; and
   incorporate the reproducible blocks into separate portions of the current display image.

5. The computer apparatus of claim 1, further comprising a passive fiber tap to retrieve the modified current display image.

6. A method comprising: at least one processor in data communication with a display device, a data storage device, and a memory storing processor executable code for configuring the at least one processor to: retrieve the streaming data; encode the streaming data; modify a current display image on the display device to include the encoded streaming data in a steganographic form; identify black spaces within the current display image; isolate least significant bits of color channels within the black spaces; and incorporate the encoded streaming data into the isolated least significant bits of each color channel within the black spaces.

7. The method of claim 6, wherein modifying the current display image comprises:
   isolating least significant bits of one or more color channels;
   identifying pixels within each color channel having a color value below a threshold; and
   incorporating the encoded streaming data into the isolated least significant bits of the one or more color channels.

8. The method of claim 6, further comprising retrieving serial output buffer data, wherein encoding the streaming data comprises encoding the serial output buffer data.

9. The method of claim 6, wherein modifying the current display image comprises:
   generating a reproducible block of modified pixels;
   reproducing the reproducible block at least once; and
   incorporating the reproducible blocks into separate portions of the current display image.

10. The method of claim 6, further comprising retrieving the modified current display image via a passive fiber tap.

11. The method of claim 6, further comprising retrieving the modified current display image via a mobile imaging device.

12. An avionics system comprising: a display device; a data storage device storing streaming data; and at least one processor in data communication with the display, the data storage device, and a memory storing processor executable code for configuring the at least one processor to: retrieve the streaming data; encode the streaming data; modify a current display image on the display device to include the encoded streaming data in a steganographic form; identify black spaces within the current image; isolate least significant bits of color channels within the black spaces; and incorporate the encoded streaming data into the isolated least significant bits of each color channel within the black spaces.

13. The avionics system of claim 12, wherein the processor executable code further configures the at least one processor to:
   isolate least significant bits of color channels within the current display image; and
   identify a default pixel color value within each color channel,
   wherein encoding the streaming data comprises associating one bit of data with a color deviation value defining a value deviation from the default pixel color value within a color channel.

14. The avionics system of claim 12, wherein the processor executable code further configures the at least one processor to retrieve and encode serial output buffer data.

15. The avionics system of claim 12, wherein the processor executable code further configures the at least one processor to:
   generate a reproducible block of modified pixels;
   reproduce the reproducible block at least once; and
   incorporate the reproducible blocks into separate portions of the current display image.

16. The avionics system of claim 12, further comprising a passive fiber tap to retrieve the modified current display image.

17. The avionics system of claim 12, wherein the processor executable code further configures the at least one processor to compress the streaming data prior to encoding.

* * * * *